United States Patent
Buesing

(10) Patent No.: US 10,280,953 B2
(45) Date of Patent: May 7, 2019

(54) COMPOSITE LAMINATE AND LOAD-INTRODUCTION COMPONENT FOR A LOAD-INTRODUCTION JOINT

(71) Applicant: AIRBUS HELICOPTERS DEUTSCHLAND GMBH, Donauworth (DE)

(72) Inventor: Moritz Buesing, Augsburg (DE)

(73) Assignee: AIRBUS HEICOPTERS DEUTSCHLAND GMBH, Donauworth (DE)

( * ) Notice: Subject to any disclaimer, the term of this patent is extended or adjusted under 35 U.S.C. 154(b) by 603 days.

(21) Appl. No.: 14/877,077

(22) Filed: Oct. 7, 2015

(65) Prior Publication Data
US 2016/0102688 A1 Apr. 14, 2016

(30) Foreign Application Priority Data
Oct. 8, 2014 (EP) .................................... 14400047

(51) Int. Cl.
*F16B 1/00* (2006.01)
*B29C 65/56* (2006.01)
(Continued)

(52) U.S. Cl.
CPC .......... *F16B 1/0071* (2013.01); *B29C 65/562* (2013.01); *B29C 65/8253* (2013.01);
(Continued)

(58) Field of Classification Search
CPC .... Y10T 403/11; Y10T 403/16; Y10T 403/20; Y10T 403/27; Y10T 403/75;
(Continued)

(56) References Cited

U.S. PATENT DOCUMENTS 1,495,687 A  5/1924  Grosclaude
2,623,086 A * 12/1952 Sampson ............. H01R 12/718
                                                      24/453
(Continued)

FOREIGN PATENT DOCUMENTS

DE  102006001444  7/2007
DE  102006007428  8/2007
(Continued)

OTHER PUBLICATIONS

Extended European Search Report for European Application No. EP 14400047.8, Completed by the European Patent Office, dated Mar. 23, 2015, 7 Pages.

*Primary Examiner* — Michael P Ferguson
(74) *Attorney, Agent, or Firm* — Brooks Kushman P.C.

(57) ABSTRACT

A composite laminate for connection to at least one attachment component in a load-introduction joint, said composite laminate comprising an opening that is adapted to receive a load-introduction component of said load-introduction joint, wherein a prefailure indication element is provided in the region of said opening, said prefailure indication element being modifiable by said load-introduction component in a prefailure mode of said load-introduction joint for indication of an impending function-affecting failure of said composite laminate. The invention is further related to a corresponding load-introduction component.

7 Claims, 11 Drawing Sheets

(51) Int. Cl.
  *B29C 65/82* (2006.01)
  *B29C 65/00* (2006.01)
  *B64C 27/48* (2006.01)
  *F16B 31/02* (2006.01)
  *B64C 27/00* (2006.01)
  *B64C 27/473* (2006.01)
  *B64D 45/00* (2006.01)
  B29L 31/30 (2006.01)
  F16B 5/02 (2006.01)
  B29L 31/08 (2006.01)

(52) U.S. Cl.
  CPC ......... *B29C 66/1122* (2013.01); *B29C 66/43* (2013.01); *B29C 66/721* (2013.01); *B64C 27/006* (2013.01); *B64C 27/473* (2013.01); *B64C 27/48* (2013.01); *B64D 45/00* (2013.01); *F16B 31/02* (2013.01); B29L 2031/082 (2013.01); B29L 2031/3088 (2013.01); B64C 2027/4736 (2013.01); B64D 2045/0085 (2013.01); F16B 5/02 (2013.01)

(58) Field of Classification Search
  CPC ........ F16B 1/0071; F16B 5/02; F16B 5/0241; F16B 2001/0078; B64C 11/04; B64C 11/08; B64C 27/48
  See application file for complete search history.

(56) References Cited

U.S. PATENT DOCUMENTS

| | | | | |
|---|---|---|---|---|
| 4,018,054 | A | * | 4/1977 | Standley ................. E21D 11/22 403/2 |
| 4,106,875 | A | * | 8/1978 | Jewett ...................... F16B 5/02 102/378 |
| 5,447,399 | A | * | 9/1995 | Yoshida .................... F16B 5/02 411/339 |
| 8,802,224 | B2 | | 8/2014 | Herrmann |
| 2004/0231937 | A1 | | 11/2004 | Goodwroth et al. |
| 2005/0053419 | A1 | * | 3/2005 | McMillan ............ F01D 21/045 403/2 |
| 2005/0053425 | A1 | * | 3/2005 | Boyce .................. F16B 5/0225 403/408.1 |
| 2006/0204364 | A1 | | 9/2006 | Li et al. |
| 2010/0135796 | A1 | | 6/2010 | Kavala et al. |
| 2012/0045613 | A1 | | 2/2012 | Sanderson |
| 2013/0136525 | A1 | * | 5/2013 | Graham .................... F16B 1/00 403/2 |

FOREIGN PATENT DOCUMENTS

| | | | | |
|---|---|---|---|---|
| DE | 102010009769 | | 9/2011 | |
| EP | 0527581 | | 2/1993 | |
| EP | 1 277 919 | * | 1/2003 | ............... F16B 5/02 |
| JP | 2012061672 | | 3/2012 | |

* cited by examiner

COMPOSITE LAMINATE AND LOAD-INTRODUCTION COMPONENT FOR A LOAD-INTRODUCTION JOINT

CROSS REFERENCE TO RELATED APPLICATION

This application claims priority to European patent application No. 14 400047.8 filed on Oct. 8, 2014, the disclosure of which is incorporated in its entirety by reference herein.

BACKGROUND OF THE INVENTION (1) Field of the Invention

The invention is related to a composite laminate for connection to at least one attachment component in a load-introduction joint by means of a load-introduction component, said composite laminate comprising the features of the claims. The invention is further related to a load-introduction component for attachment of at least one attachment component to a composite laminate in a load-introduction joint, said load-introduction component comprising the features of the claims.

(2) Description of Related Art

A load-introduction joint generally defines a connection between at least two different components, wherein a load is introduced from at least one first component into at least one second component. For instance, in aerospace engineering such a load-introduction joint is amongst others embodied between a rotor blade and an associated rotor head of a rotor in a rotary-wing aircraft, wherein the rotor blade is joined to the rotor head by at least one suitable load-introduction component.

More specifically, in commonly used rotary-wing aircrafts the rotor blades are usually embodied as composite laminates made from composite materials, such as fiber reinforced polymers (FRP), which are joined to a respective rotor head by means of bolts. In operation of such a rotary-wing aircraft, loads acting on a given rotor blade are, thus, applied to the composite laminate defining the rotor blade and act on the composite laminate in essentially one main load direction that is defined by the longitudinal axis of the rotor blade. These loads are introduced from the composite laminate in the main load direction into the rotor head by means of at least one bolt, which defines the load-introduction component in the corresponding load-introduction joint.

The above described load-introduction joint is implemented as a bolted connection, as the load introduction into the composite laminate is performed by means of at least one bolt acting as load-introduction component. In such a bolted connection with a single main load direction, an underlying diameter d of the bolt, a diameter D of an opening provided in the composite laminate for reception of the bolt, a thickness t of the composite laminate, a distance e1 from the center of the opening to an edge of the composite laminate that is arranged in parallel to the main load direction, and a distance e2 from the center of the opening to an adjacent edge of the composite laminate that is arranged perpendicular to the main load direction, are considered as critical dimensions in the design of the bolted connection.

However, it should be noted that in cases, where the bolted connection comprises multiple bolts that are arranged in close relationship with respect to each other, only half of a given distance between the centers of two neighboring openings provided in the composite laminate are used for the determination of e1 or e2, depending on underlying relative positions of the neighboring openings on the composite laminate and the main load direction. Furthermore, in cases without a single main load direction, a smallest determinable edge distance e_min is considered.

The above described critical dimensions are considered during manufacturing of bolted connections, i.e. constituent components thereof. Conventional bolted connections with a composite laminate are usually realized according to one of two different main manufacturing techniques. These two different main manufacturing techniques are briefly described hereinafter.

The document JP 2012/061672 A describes a bolted connection that is embodied according to a first manufacturing technique with a composite laminate having fibers that are arranged in a loop around an opening in the composite laminate. The fibers are implemented as straight lines towards or away from the opening from or into the composite laminate. The opening is adapted to receive a load-introducing bolt, such that an elasto-mechanical mechanism is created which transforms radial forces resulting from a contact between the opening and the bolt into tangential forces in the composite laminate around the opening. Stresses that are directly resulting from these radial forces are referred to as "bearing stresses", while stresses that are resulting from the tangential forces are referred to as "tangential stresses".

In such a bolted connection that is embodied according to this first manufacturing technique, the orientations of the tangential stresses and the fibers are essentially parallel to each other, as the fibers are arranged in a loop around the opening. Thus, the composite laminate has its highest strength in parallel to the fiber orientations. Furthermore, in adequately designed loops the tangential stresses are larger than the bearing stresses and the elasto-mechanical mechanism that transforms the radial forces into the tangential forces results in shear stresses, which act between the fibers.

However, manufacturing of such a composite laminate having fibers that are arranged in a loop around an opening in the composite laminate is generally complicated, time-consuming and expensive, as it is difficult, and often impossible, to automate fiber placement during manufacturing, so that usually manual fiber placement is required. Furthermore, an available design space for such composite laminates is constrained, as usually comparatively small relative edge distances with e/D <2 are requested, so that a proper design of a composite laminate that is suitable to bear high loads would require large thicknesses t of the composite laminate.

The document US 2012/0045613 A1 describes a bolted connection that is embodied according to a second manufacturing technique with a composite laminate having multiple layers. Each layer comprises straight fiber orientations or is embodied as a fabric with two straight fiber orientations. More specifically, the fiber orientations in the multiple layers of the composite laminate are selected in order to bear the different load components described above, i.e. bearing stresses, tangential stresses and shear stresses. Accordingly, the fibers can be unidirectional, woven, knitted, braided, stitched, and so on.

In such a bolted connection that is embodied according to the second manufacturing technique, the composite laminate is provided with an opening that is adapted to receive a load-introducing bolt. The composite laminate as such is generally referred to as "bearing laminate".

However, such a bearing laminate has associated failure modes that may occur abruptly in operation and, thus, affect safety of use of the bearing laminate. In order to increase the safety of use, an implementation of gradual failure modes is required. This can, e.g., be achieved by designing the bearing laminate with comparatively large relative edge distances of e/D>2~3, depending on the type of bearing laminate, and small thicknesses t of the bearing laminate.

It should be noted that alternative manufacturing techniques of composite laminates for bolted connections are also known. Such alternative manufacturing techniques are, by way of example, described in the documents DE 10 2006 001 444 A1, DE 10 2006 007 428 A1 and DE 10 2010 009 769 A1. Furthermore, the above described first and second manufacturing techniques can be combined, so that composite laminates consisting of layers that are embodied as loops and layers that are embodied as bearing laminates are obtained.

However, all such manufacturing techniques are complicated, time-consuming and expensive, or result in composite laminates with comparatively large relative edge distances.

BRIEF SUMMARY OF THE INVENTION

It is, therefore, an object of the present invention to provide a composite laminate for a bolted connection and, more generally, for a load-introduction joint, said composite laminate being comparatively easy and inexpensive to manufacture and adapted to increase safety in operation. This object is solved by a composite laminate for connection to at least one attachment component in a load-introduction joint, said composite laminate having the features of claim 1.

More specifically, according to the present invention a composite laminate for connection to at least one attachment component in a load-introduction joint comprises an opening that is adapted to receive a load-introduction component of said load-introduction joint. A prefailure indication element is provided in the region of said opening. Said prefailure indication element is modifiable by said load-introduction component in a prefailure mode of said load-introduction joint for indication of an impending function-affecting failure of said composite laminate. Preferably, said prefailure indication element is modifiable by said load-introduction component in said prefailure mode of said load-introduction joint such that said prefailure indication element is at least compressible and/or at least partly destructible by said load-introduction component.

Advantageously, by providing the prefailure indication element, an impending function-affecting failure of the composite laminate can be detected safely and reliably prior to its occurrence and may, therefore, be avoided. In other words, by providing the prefailure indication element, extra time for detection of an impending function-affecting failure of the composite laminate is gained. Thus, safety and reliability of load-introduction joints with composite laminates can be increased substantially.

According to one aspect, a given bearing surface between the composite laminate and the load-introduction component in the load-introduction joint is reduced by modifying a cylindrical interface between the load-introduction component, such as a bolt or a bushing, and the opening in the composite laminate. This is preferably achieved by creating one or more cut-outs on at least one side of the opening in the composite laminate for reducing a given contact surface between the bolt or bushing and the composite laminate in the load-introduction joint, which is subject to normal loads in operation due to a respectively applied external load. The cut-outs are created such that, e.g., at least one prefailure indication projection is formed that defines the inventive prefailure indication element.

Preferably, said at least one prefailure indication projection comprises a projection thickness that amounts at least to 50% and at most to 90% of a thickness of said composite laminate. More specifically, said at least one prefailure indication projection preferably comprises a length that amounts to at least 0.5% of a given diameter D of the opening, if D>40 mm, and that amounts maximally to 50% of said given diameter D, if D<4 mm, said length being preferentially comprised in a range from 0.2 mm to 2 mm. Furthermore, said at least one prefailure indication projection preferably comprises a constituting material that is weaker than a constituting material of said composite laminate.

However, it should be noted that this inventive prefailure indication element is not necessarily formed by one or more cut-outs in the form of said prefailure indication projection. For instance, at least two prefailure indication projections can be provided that are defined by peripheral recesses, instead of cut-outs, that are embodied in the region of said opening. Other embodiments are also possible and contemplated within the context of the present invention. For instance, one or more of the layers defining the composite laminate, which have a comparatively high stiffness normal to the cylindrical surface of the opening and which have a comparatively high bearing strength, can locally be replaced with prefailure layers having a low stiffness and a low strength normal to said cylindrical surface. This increases the bearing stress in the remaining high stiffness layers, which contribute most to the overall bearing strength.

According to one aspect of the present invention, at least one prefailure layer is mounted into the opening of the composite laminate. Said at least one prefailure layer preferably comprises a laminate section with dummy layers that are arranged in an underlying prefailure zone.

Advantageously, compared to composite laminates that are embodied according to the above described loop design, the inventive composite laminate can be produced using automated processes. This leads to a cheaper manufacturing, but with comparable strengths, and also allows for an easier manufacturing, e.g. using resin transfer processes.

Furthermore, by providing the inventive composite laminate with the prefailure indication element that is adapted for indicating an impending function-affecting failure of said composite laminate in an associated prefailure mode, the available design space for efficient and safe application of composite laminates in load-introduction joints can be expanded. In particular, it allows composite laminate designs with smaller relative edge distances e/D compared to e.g. conventional bearing laminates as described above. Such smaller relative edge distances e/D advantageously result in smaller stress concentration factors for the shear stresses and tangential stresses that may occur in the composite laminate in operation. These smaller relative edge distances allow manufacturing of composite laminates that are, at a same load level for function-affecting failure, more light weight than conventional bearing laminates that are designed with detectable prefailure modes.

In operation of a load-introduction joint with a composite laminate according to the present invention, the full cylindrical surface of the opening in the region of the prefailure indication element only comes into contact with the bolt or bushing after the prefailure indication element, i.e. the material defining the prefailure indication element, has failed, i.e. in the prefailure mode. In other words, in a normal operation mode of the load-introduction joint, the bearing strength of the composite laminate is reduced and only in the prefailure mode, i.e. after failure of the prefailure indication element has occurred, the full bearing strength is obtained. Thus, further progression of the failure is at least temporarily stopped or slowed down, which expands a detection time interval, in which the prefailure and, thus, an impending function-affecting failure of said composite laminate can be detected and accordingly provides the extra time as described above.

According to a preferred embodiment, said prefailure indication element is provided in the region of said opening at least on a peripheral side of said opening that is arranged diametrically opposed to a main load direction of a main load that is applicable to said composite laminate in operation.

According to a further preferred embodiment, said prefailure indication element comprises at least one prefailure indication projection that is arranged in said opening.

According to a further preferred embodiment, said at least one prefailure indication projection is arc-shaped.

According to a further preferred embodiment, said at least one arc-shaped prefailure indication projection is arranged between a first and a second arc-shaped axial recess provided in the region of said opening.

According to a further preferred embodiment, said at least one arc-shaped prefailure indication projection is arranged between a first and a second tangential recess provided in the region of said opening.

According to a further preferred embodiment, said at least one prefailure indication projection is annular.

According to a further preferred embodiment, said at least one annular prefailure indication projection is arranged between a first and a second axial chamfer provided on each axial end of said opening.

According to a further preferred embodiment, said at least one prefailure indication projection comprises at least one undercut that is adapted to divide said at least one prefailure indication projection into first and second projection sections.

The present invention further provides a load-introduction component for attachment of at least one attachment component to a composite laminate in a load-introduction joint. Said load-introduction component comprises a cylindrical section that is adapted to be received in an opening provided in said composite laminate. A prefailure indication element is provided on said cylindrical section. Said prefailure indication element is adapted to modify said composite laminate in a prefailure mode of said load-introduction joint for indication of an impending function-affecting failure of said composite laminate.

According to one aspect, a given bearing surface between the load-introduction component and the composite laminate in the load-introduction joint is reduced by modifying a cylindrical interface between the load-introduction component and the opening in the composite laminate. This is preferably achieved by creating one or more cut-outs and/or recesses on at least one peripheral side of the load-introduction component for reducing a given contact surface between the load-introduction component and the composite laminate in the load-introduction joint, which is subject to normal loads in operation of the load-introduction joint due to a respectively applied external load.

According to a preferred embodiment, said prefailure indication element comprises at least one annular recess provided on said cylindrical section.

According to a further preferred embodiment, said prefailure indication element comprises at least one peripheral cut-out provided on said cylindrical section. Preferably, two peripheral cut-outs are provided, said two peripheral cut-outs being arranged in mirror-symmetry relative to each other.

According to a further preferred embodiment, said at least one peripheral cut-out is arranged in parallel to a middle axis of said load-introduction component.

According to a further preferred embodiment, said load-introduction component is embodied as a bolt, wherein said cylindrical section is embodied as a bolt shaft.

According to a further preferred embodiment, said load-introduction component is embodied as a bushing, wherein said cylindrical section is embodied as a sleeve-like area. Preferably, said bushing comprises an outer circumference that is arranged concentrically or eccentrically to an inner opening defined by said sleeve-like area. According to one aspect, said bushing comprises an elliptical outer circumference.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
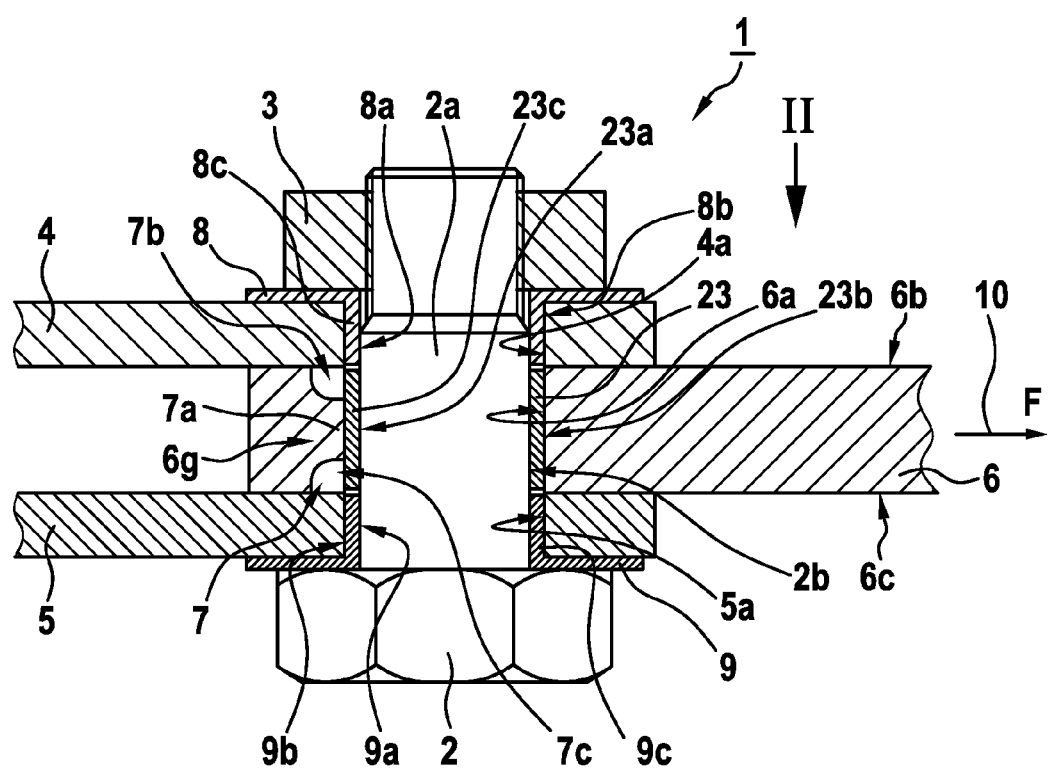
FIG. 1 shows a sectional view of a load-introduction joint with a composite laminate and a load-introduction component according to a first embodiment of the invention.

FIG. 1 shows a load-introduction joint 1 according to the present invention, which comprises a composite laminate 6 that is connected to at least one, and illustratively two attachment components 4, 5 by means of at least one associated load-introduction component. The latter is adapted to introduce loads that are applied to the composite laminate 6 into the attachment components 4, 5.

By way of example, the load-introduction joint 1 can be used to connect a rotor blade of a multi-blade rotor of a rotary-wing aircraft to a rotor head of said multi-blade rotor. In this case, the composite laminate 6 is associated with, or integrated into, the rotor blade and the attachment components 4, 5 are associated with the rotor head and, e.g., integrated into a flexbeam thereof.

According to one aspect, the load-introduction component comprises a bolt 2 with a bolt shaft 2a and three bushings 8, 9, 23. A first bushing 8 is arranged in an associated opening 4a provided in the attachment component 4, a second bushing 9 is arranged in an associated opening 5a provided in the attachment component 5, and a third bushing 23 is arranged in an associated opening 6a provided in the composite laminate 6. All three bushings 8, 9, 23 are equipped with corresponding openings 8a, 9a, 23a, respectively, wherein the bolt shaft 2a with an outer circumference 2b is arranged. The bolt 2 is secured in the bushings 8, 9, 23 by means of a nut 3 and, thus, secures the bushings 8, 9, 23 to the attachment components 4, 5 and the composite laminate 6 on the one hand and, on the other hand, attaches the composite laminate 6 to the attachment components 4, 5.

In operation of the load-introduction joint 1, a main load F that is, e.g., applicable to the composite laminate 6 in a main load direction 10, which illustratively corresponds to a longitudinal extension of the composite laminate 6, is introduced from the composite laminate 6 via the bushing 23 into the bolt 2, i.e. the bolt shaft 2a, and from the bolt shaft 2a via the bushings 8, 9 into the attachment components 4, 5, respectively. Thus, in a strict sense the third bushing 23 defines the load-introduction component in the load-introduction joint 1 with respect to the composite laminate 6.

However, it should be noted that use of the three bushings 8, 9, 23 is only optional and not mandatory for realization of the present invention. In fact, the three bushings 8, 9, 23 can alternatively be implemented as only one or two bushings or, still alternatively, be omitted, if the underlying dimensions of the openings 4a, 5a, 6a provided in the attachment components 4, 5 and the composite laminate 6 match the underlying dimensions of the bolt shaft 2a, i.e. its outer circumference 2b, at least within usual predetermined manufacturing tolerances that allow to press-fit or screw the bolt 2 into the attachment components 4, 5 and the composite laminate 6. In this case, the bolt 2 defines the load-introduction component of the load-introduction joint 1. Therefore, the load-introduction component of the load-introduction joint 1 is hereinafter referred to with the reference sign "2", for simplicity.

Illustratively, the composite laminate 6 with the opening 6a comprises an upper side 6b and an opposed lower side 6c and is preferably embodied similar to a bearing laminate. On the upper side 6b, the attachment component 4 with the opening 4a is arranged. Therefore, the attachment component 4 is hereinafter referred to as the "upper" component, for simplicity and brevity. On the lower side 6c, the attachment component 5 with the opening 5a is arranged. Therefore, the attachment component 5 is hereinafter referred to as the "lower" component, for simplicity and brevity.

The opening 4a of the upper component 4 has dimensions that preferably match corresponding dimensions of an outer circumference 8b of a sleeve-like area 8c of the first bushing 8, at least within usual predetermined manufacturing tolerances in analogy to what is said above. It should be noted that the sleeve-like area 8c illustratively merges into a flange-like extension arranged essentially between the upper component 4 and the nut 3. However, this flange-like extension is only optional and, therefore, not specifically referenced, for simplicity and clarity of the drawings.

The opening 5a of the lower component 5 has dimensions that preferably match corresponding dimensions of an outer circumference 9b of a sleeve-like area 9c of the second bushing 9, at least within usual predetermined manufacturing tolerances in analogy to what is said above. It should be noted that the sleeve-like area 9c illustratively merges into a flange-like extension arranged essentially between the lower component 5 and a bolt head 2d of the bolt 2. However, this flange-like extension is only optional and, therefore, not specifically referenced, for simplicity and clarity of the drawings.

According to one aspect of the present invention, the opening 6a of the composite laminate 6 is provided with a prefailure indication element 7. More specifically, this prefailure indication element 7 is preferably provided in the region of the opening 6a, preferentially at least on a mainly loaded side thereof, and modifiable by the load-introduction component 2 in a prefailure mode of the load-introduction joint 1 for indication of an impending function-affecting failure of the composite laminate 6. Such a modification of the prefailure indication element 7 by the load-introduction component 2 in the prefailure mode comprises, for instance, an at least partial compression and/or destruction of the prefailure indication component 7.

In other words, the prefailure indication element 7 is adapted to fail without affecting the overall function of the load-introduction joint 1. However, after such a failure of the prefailure indication element 7, a subsequent function-affecting failure of the load-introduction joint 1 as such must reasonably be expected. Therefore, the load-introduction joint 1 is considered being in a "prefailure mode" after failure of the prefailure indication element 7.

Preferably, the prefailure indication element 7 is provided at least on a peripheral side 6g of the opening 6a that is arranged diametrically opposed to the main load direction 10 of the main load F and, thus, defines the mainly loaded side of the opening 6a. The prefailure indication element 7 can be realized by one or more prefailure indication projections and is, illustratively, realized by a single prefailure indication projection 7a that is arranged in the opening 6a. In the region of the single prefailure indication projection 7a, the opening 6a has dimensions that preferably match corresponding dimensions of an outer circumference 23b of a sleeve-like area 23c of the third bushing 23, at least within usual predetermined manufacturing tolerances in analogy to what is said above.

Figure 2:
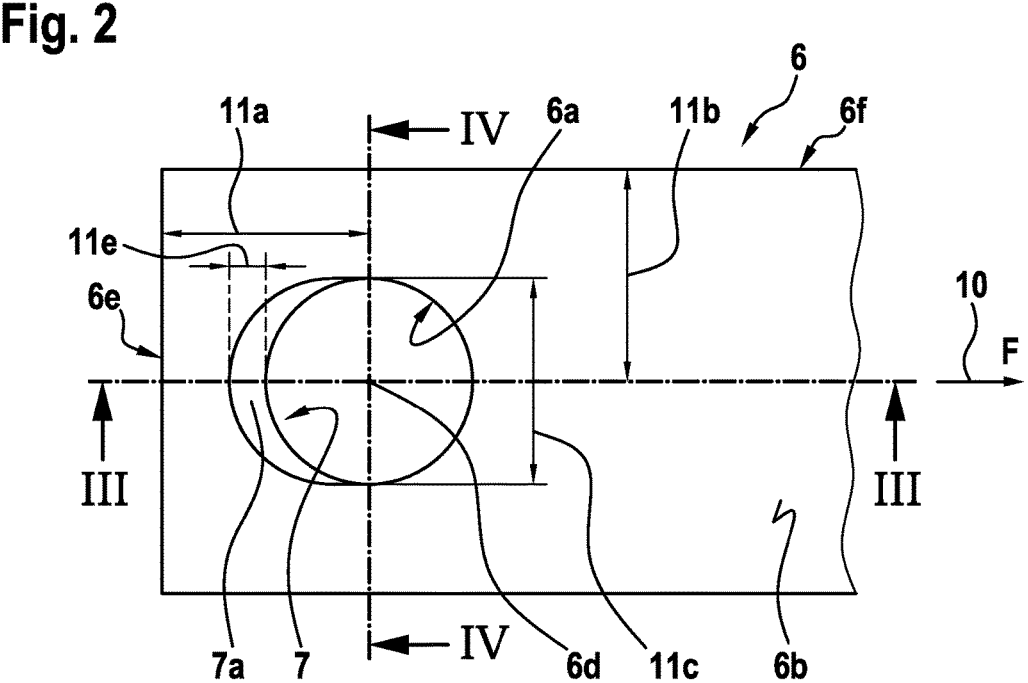
FIG. 2 shows a top view of the composite laminate of FIG. 1, seen in direction of an arrow II of FIG. 1.

According to a first embodiment, the single prefailure indication projection 7a is arc-shaped and provided only on the mainly loaded side of the opening 6a, as illustrated in greater detail in FIG. 2. This arc-shaped prefailure indication projection 7a is preferably arranged between a first and a second arc-shaped axial recess 7b, 7c provided in the region of the opening 6a.

FIG. 2 shows the upper side 6b of the composite laminate 6 of FIG. 1, which is provided with the opening 6a and the prefailure indication element 7 with the prefailure indication projection 7a. The latter illustratively comprises a maximal length 11e in the main load direction 10 of FIG. 1.

The opening 6a has a center 6d and an opening diameter 11c. The center 6d is illustratively arranged on a longitudinal axis of the composite laminate 6, which is coaxial to the main load direction 10 of FIG. 1, by way of example.

The composite laminate 6 comprises longitudinal edges between its upper side 6b and its lower side 6c of FIG. 1, which are illustratively oriented in parallel to the main load direction 10 and from which only the—in FIG. 2—upper longitudinal edge is labelled with the reference sign 6f. The composite laminate 6 further comprises end edges between its upper side 6b and its lower side 6c of FIG. 1, which are illustratively oriented perpendicular to the main load direction 10 and from which only the—in FIG. 2—left end edge is shown and labelled with the reference sign 6e.

Between the end edge 6e and the opening center 6d, an end edge distance 11a is embodied. Between the longitudinal edge 6f and the opening center 6d, a longitudinal edge distance 11b is embodied. The relation between the end edge distance 11a or the longitudinal edge distance 11b and the opening diameter 11c is preferably less than 2 and, illustratively, equal to 1.

Furthermore, according to one aspect of the present invention, the length 11e of the prefailure indication projection 7a is determined dependent on the opening diameter 11c. More specifically, the length 11e preferably amounts to at least 0.5% of the opening diameter 11c, if the latter is greater than 40 mm. If, however, the opening diameter 11c is less than 4 mm, the length 11e preferably amounts maximally to 50% of said opening diameter 11c. More generally, the length 11e is preferentially comprised in a range from 0.2 mm to 2 mm.

Figure 3:
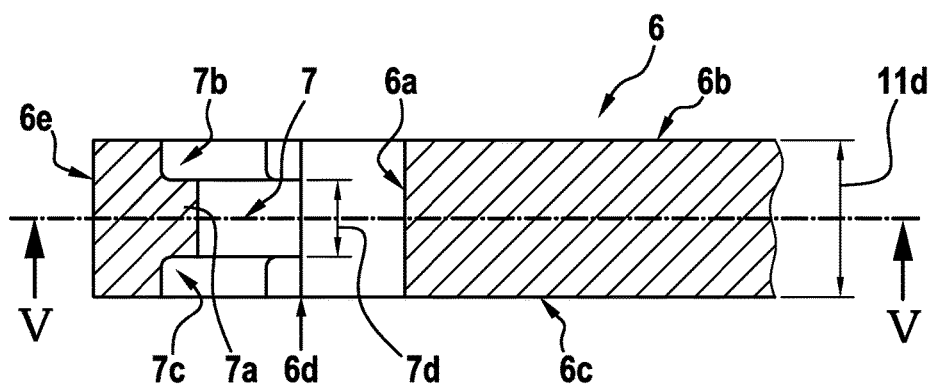
FIG. 3 shows a sectional view of the composite laminate of FIG. 1 and FIG. 2, seen in direction of arrows III-III of FIG. 2.

FIG. 3 shows the composite laminate 6 with the opening 6a and the prefailure indication element 7 with the prefailure indication projection 7a of FIG. 1 and FIG. 2 in greater detail. FIG. 3 further illustrates the axial recesses 7b, 7c of FIG. 1 that delimit the prefailure indication projection 7a.

Illustratively, the composite laminate 6 exhibits between its upper and lower sides 6b, 6c a thickness 11d and the prefailure indication projection 7a exhibits a projection thickness 7d. Preferably, this projection thickness 7d comprises 50% to 90% of the thickness 11d of the composite laminate 6, and illustratively amounts to 50% thereof.

Figure 4:
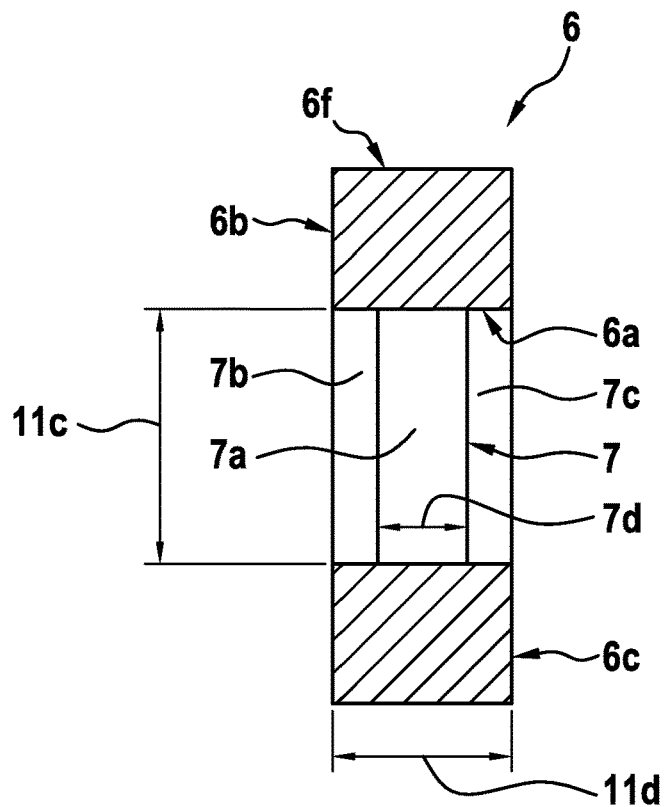
FIG. 4 shows a sectional view of the composite laminate of FIG. 1 and FIG. 2, seen in direction of arrows IV-IV of FIG. 2.

FIG. 4 shows the composite laminate 6 with the opening 6a of FIG. 1 to FIG. 3 to further illustrate the opening diameter 11c and the projection thickness 7d of the prefailure indication projection 7a according to FIG. 3.

Figure 5:
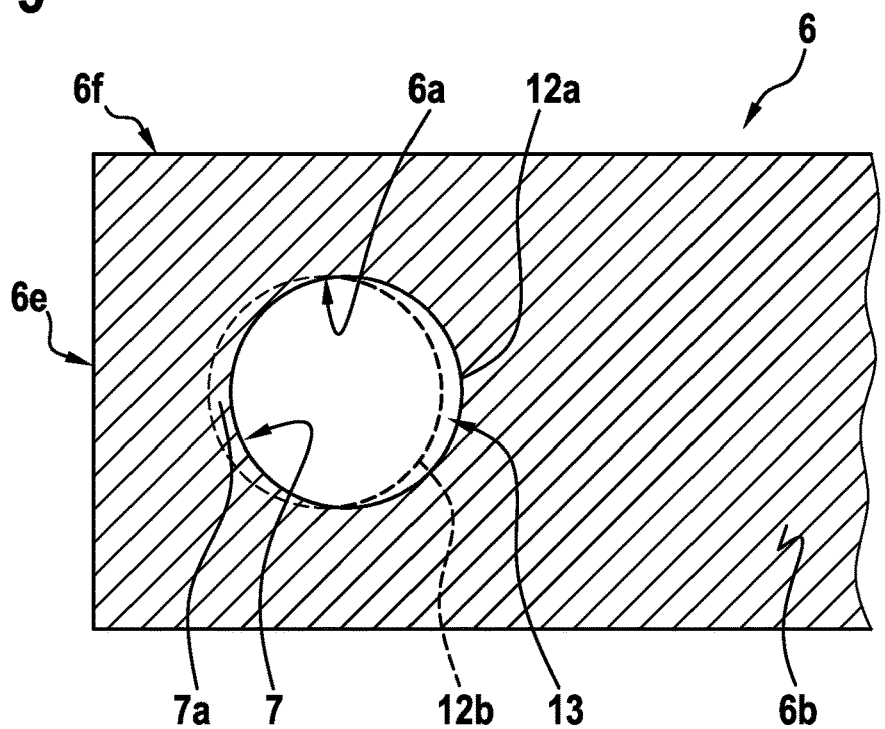
FIG. 5 shows a sectional view of the composite laminate of FIG. 2 and FIG. 3 in a normal operation mode and in the prefailure mode, seen in direction of arrows V-V of FIG. 3.

FIG. 5 shows the composite laminate 6 of FIG. 1 to FIG. 4 in a normal operation mode and in the prefailure mode according to the present invention. In the normal operation mode, the bolt shaft 2a of the bolt 2 of FIG. 1 and/or the sleeve-like area 23c of the bushing 23 of FIG. 1 are arranged in an initial position 12a in the opening 6a of the composite laminate 6 and the prefailure indication element 7, i.e. the prefailure indication projection 7a of FIG. 1 to FIG. 4, is intact, i.e. unmodified.

In contrast thereto, the prefailure indication projection 7a is modified i.e. at least partly compressed and/or destroyed, in the prefailure mode, wherein the bolt shaft 2a of the bolt 2 of FIG. 1 and/or the sleeve-like area 23c of the bushing 23 of FIG. 1 are arranged in a prefailure indication position 12b. In this prefailure indication position 12b, a gap 13 is formed between the composite laminate 6 and the bolt 2 and/or the bushing 23 in the opening 6a. This gap 13 is preferably adapted to allow for an easy and reliable detection of the prefailure mode.

It should be noted that the gap 13 as such is not directly detectable, as it is covered by the upper and lower components 4, 5 in FIG. 1, However, if the gap 13 is formed a relative positioning of the composite laminate 6 with respect to these upper and lower components 4, 5 is changed and easily detectable.

Figure 6:
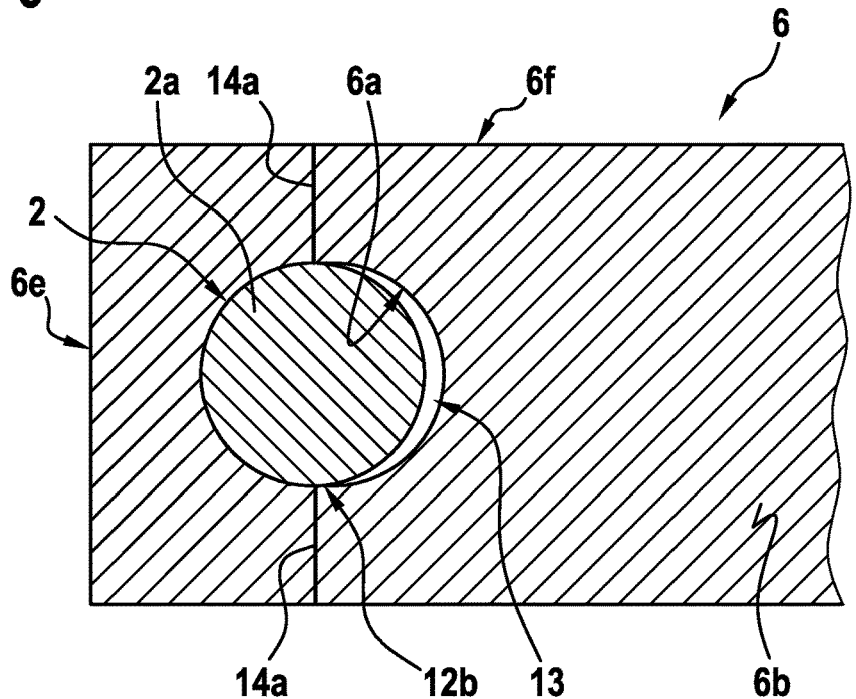
FIG. 6 shows the composite laminate and the load-introduction component of FIG. 1 in a first possible function-affecting failure mode.
Figure 7:
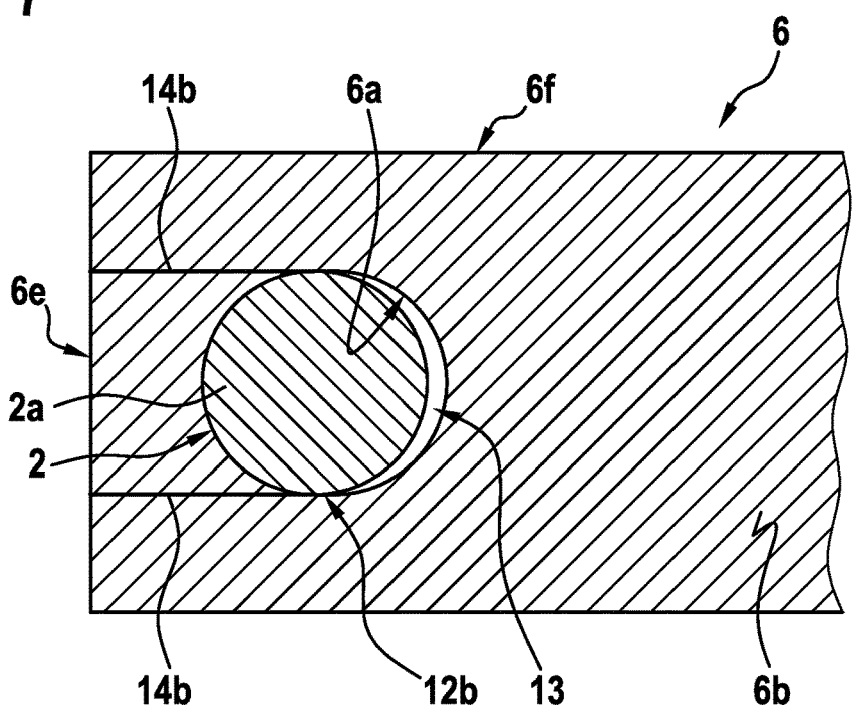
FIG. 7 shows the composite laminate and the load-introduction component of FIG. 1 in a second possible function-affecting failure mode.

FIG. 6 and FIG. 7 show the composite laminate 6 of FIG. 5 in the prefailure mode. For simplicity, only the bolt shaft 2a of the bolt 2 of FIG. 1 is respectively illustrated in the opening 6a of the composite laminate 6 and arranged in the prefailure indication position 12b according to FIG. 5.

As indicated above, the prefailure mode alerts and indicates an impending function-affecting failure of the composite laminate 6. Such a function-affecting failure can e.g. be caused by transversal ruptures 14a occurring in the composite laminate 6 according to FIG. 6, and/or by longitudinal ruptures 14b occurring in the composite laminate 6 according to FIG. 7. However, by detecting the prefailure mode by means of the gap 13, an impending occurrence of such transversal and/or longitudinal ruptures can be predicted and counter-measures can be taken in advance, e.g. by exchanging the composite laminate 6.

It should be noted that in the composite laminate 6 according to the first embodiment, which is described as such in detail above with reference to FIGS. 1 to 4, the prefailure indication element 7 and, more particularly, the prefailure indication projection 7a is implemented by forming the axial recesses 7b, 7c inside the opening 6a. These axial recesses 7b, 7c are illustratively C-shaped in cross-section and preferably produced during manufacture of the composite laminate 6, e.g. by adequately forming layers that are lying upon each other. Alternatively, the axial recesses 7b, 7c can be formed by producing elongated blind holes in the opening 6a. Furthermore, only the single main load direction 10 was assumed. However, other shapes and production techniques and also more than one main load directions are also contemplated, as described below with reference to FIGS. 8 to 14.

Figure 8:
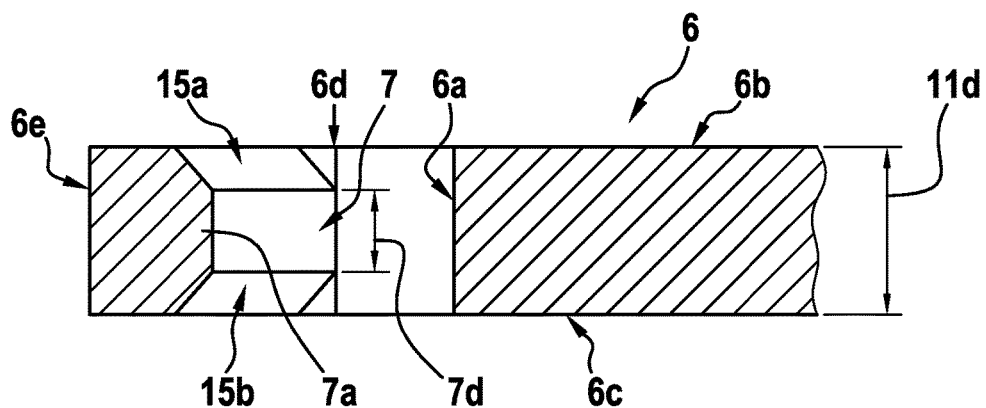
FIG. 8 shows a sectional view of the composite laminate of FIG. 1 and FIG. 2, seen in direction of arrows III-III of FIG. 2, according to a second embodiment.

FIG. 8 shows the composite laminate 6 of FIG. 1 with the prefailure indication element 7 having the prefailure indication projection 7a that is provided in the opening 6a and now embodied according to a second embodiment. In this second embodiment, the prefailure indication projection 7a is arc-shaped and arranged between a first and a second axial chamfer 15a, 15b that are provided on each axial end of the opening 6a. However, these axial chamfers 15a, 15b, and consequently also the arc-shaped prefailure indication projection 7a, are only provided on a mainly loaded side of the opening 6a, i.e. illustratively adjacent to the end edge 6e.

Figure 9:
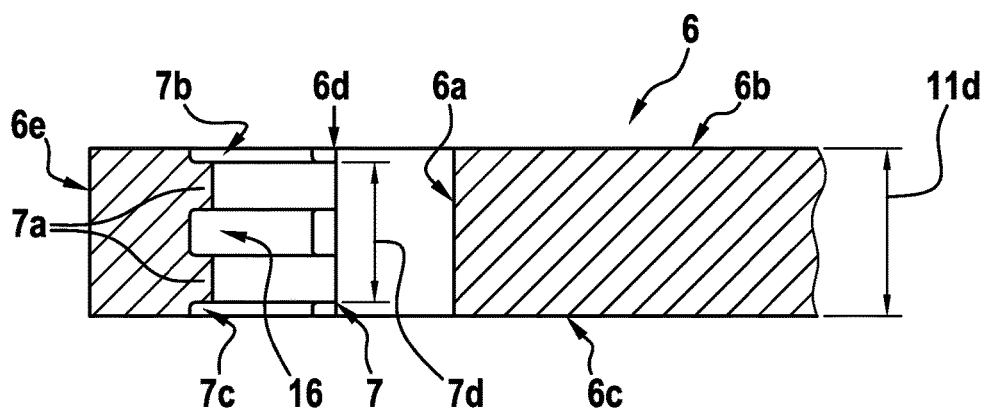
FIG. 9 shows a sectional view of the composite laminate of FIG. 1 and FIG. 2, seen in direction of arrows III-III of FIG. 2, according to a third embodiment.

FIG. 9 shows the composite laminate 6 of FIG. 1 with the prefailure indication element 7 having the prefailure indication projection 7a with the axial recesses 7b, 7c that are provided in the opening 6a and now embodied according to a third embodiment. In this third embodiment, the axial recesses 7b, 7c, and consequently also the prefailure indication projection 7a, are again arc-shaped and only provided on a mainly loaded side of the opening 6a, i.e. illustratively adjacent to the end edge 6e, like in the first embodiment. Alternatively, they can be annular in the case of multiple possible load directions.

However, the axial recesses 7b, 7c are smaller than in the first embodiment. Furthermore, the prefailure indication projection 7a comprises at least one undercut 16 that is adapted to divide said at least one prefailure indication projection 7a into first and second projection sections. Thus, a more even pressure distribution on the prefailure indication projection 7a can be achieved in operation, or more pressure near the end edge 6e of the composite laminate 6 is achievable so that a higher strength against bending moments can be realized.

In other words, by dividing the at least one prefailure indication projection 7a into first and second projection sections, two prefailure indication projections are created, which are illustratively arranged in parallel to the longitudinal extension of the composite laminate 6. More generally, two or more prefailure indication projections can be defined by peripheral recesses and/or undercuts that are provided in the region of the opening 6a, independent on whether the peripheral recesses and/or undercuts are oriented in parallel, perpendicular or transversely to the longitudinal extension of the composite laminate 6. Such a configuration can likewise be obtained by thinning out the composite laminate 6 in the region of the prefailure indication element 7.

Figure 10:
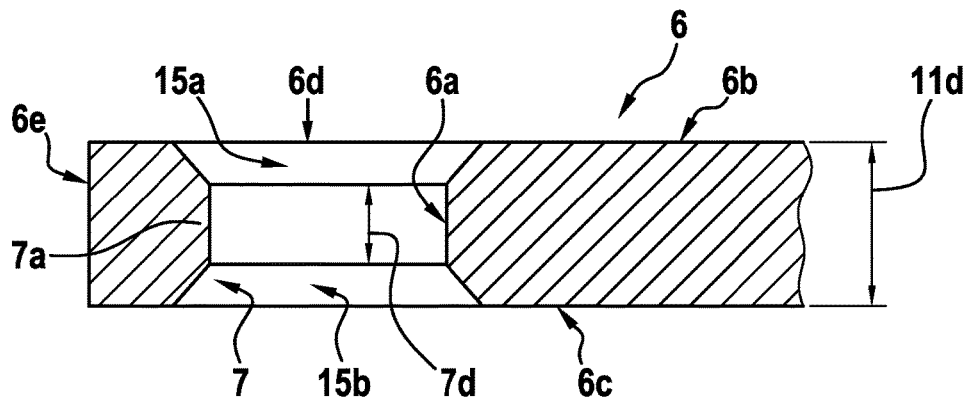
FIG. 10 shows a sectional view of the composite laminate of FIG. 1 and FIG. 2, seen in direction of arrows III-III of FIG. 2, according to a fourth embodiment.

FIG. 10 shows the composite laminate 6 of FIG. 1 with the prefailure indication element 7 having the prefailure indication projection 7a that is provided in the opening 6a and now embodied according to a fourth embodiment. In this fourth embodiment, the prefailure indication projection 7a is arranged between a first and a second axial chamfer 15a, 15b that are provided on each axial end of the opening 6a, like in the second embodiment. However, in contrast to this second embodiment, the axial chamfers 15a, 15b, and the prefailure indication projection 7a are now annular. This is particularly useful if multiple load directions are possible instead of the single main load direction 10 of FIG. 1.

Figure 11:
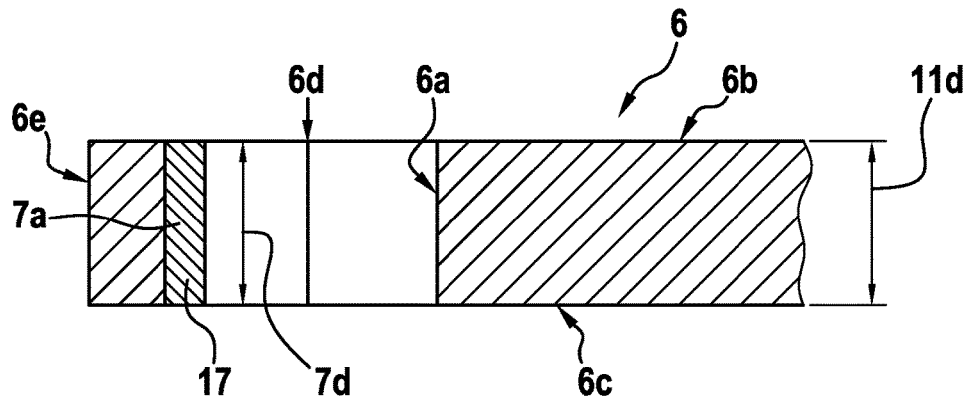
FIG. 11 shows a sectional view of the composite laminate of FIG. 1 and FIG. 2, seen in direction of arrows III-III of FIG. 2, according to a fifth embodiment.

FIG. 11 shows the composite laminate 6 of FIG. 1 with the prefailure indication element 7 having the prefailure indication projection 7a that is provided in the opening 6a and now embodied according to a fifth embodiment. In this fifth embodiment, the prefailure indication projection 7a is illustratively arc-shaped like in the first embodiment. However, in contrast to the first embodiment, the prefailure indication projection 7a now comprises at least one prefailure layer 17 that is mounted into the opening 6a. Preferably, the prefailure layer 17 comprises a laminate section with one or more dummy layers that define the prefailure indication projection 7a.

More specifically, in the composite laminate 6 an underlying bearing force is mainly carried by layers with high stiffness and high strength in the normal direction of the bearing stress. The bearing stress in these layers can be increased by locally replacing some of the layers with dummy layers that have a low stiffness and low strength in the normal direction of the bearing stress, thereby defining the prefailure layer 17. This can, e.g., be reached by replacing some of the 0° layers, which are oriented parallel to the main load direction 10 of FIG. 1, with other layers, e.g., 90° layers, or non-FRP layers.

Figure 12:
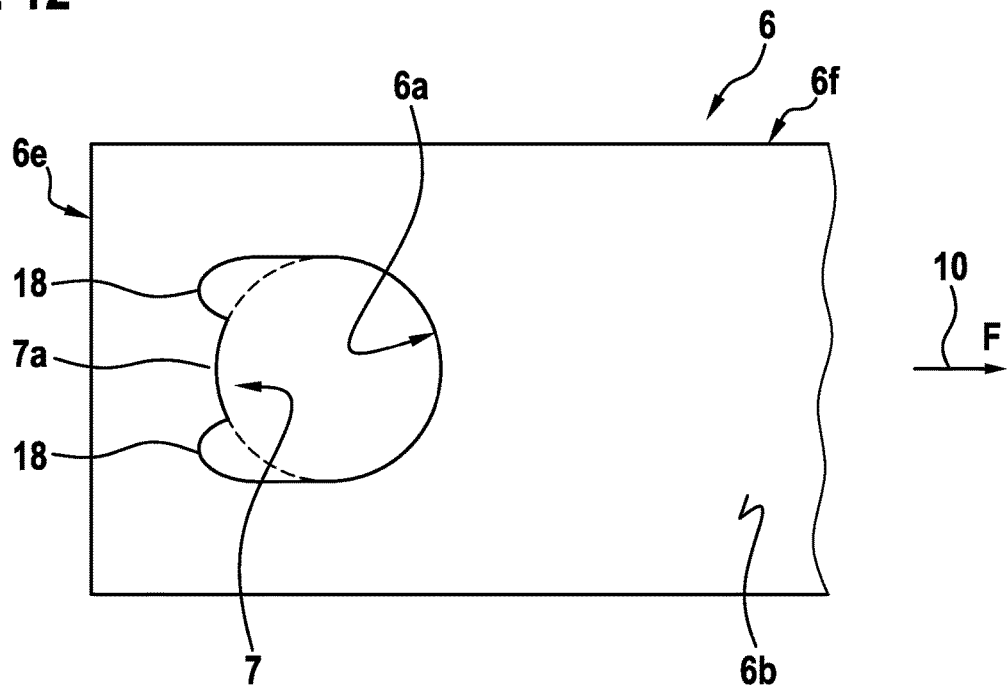
FIG. 12 shows a sectional view of the composite laminate of FIG. 1 and FIG. 2, seen in direction of arrows III-III of FIG. 2, according to a sixth embodiment.

FIG. 12 shows the composite laminate 6 of FIG. 1 with the prefailure indication element 7 having the prefailure indication projection 7a that is provided in the opening 6a and now embodied according to a sixth embodiment. In this sixth embodiment, the prefailure indication projection 7a is again arc-shaped and only provided on a mainly loaded side of the opening 6a, i.e. illustratively adjacent to the end edge 6e, like in the first embodiment. However, the prefailure indication projection 7a is now arranged between a first and a second tangential recess 18 provided in the region of the opening 6a on said mainly loaded side. Illustratively, the tangential recesses 18 are ear-shaped.

Figure 13:
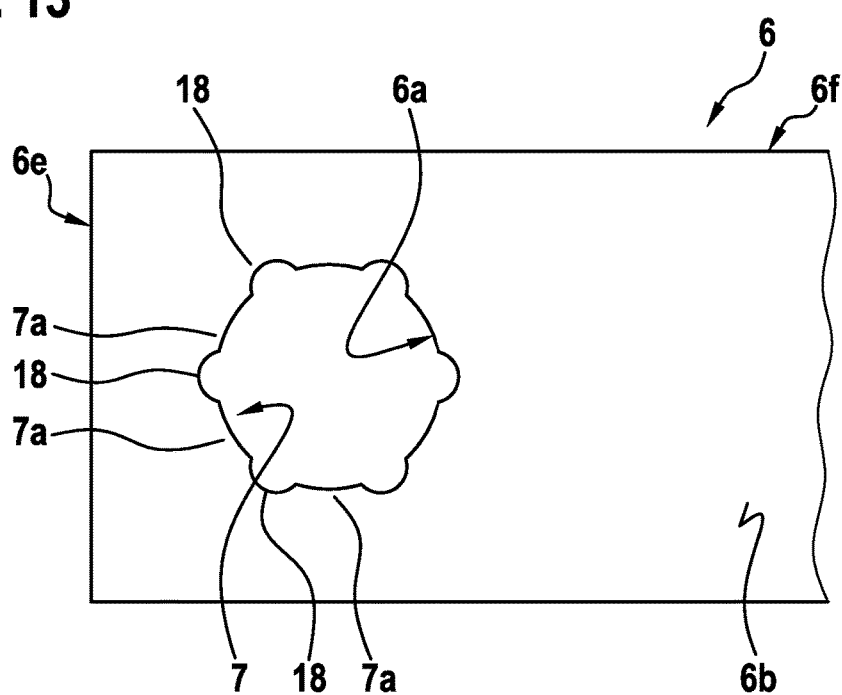
FIG. 13 shows a sectional view of the composite laminate of FIG. 1 and FIG. 2, seen in direction of arrows III-III of FIG. 2, according to a seventh embodiment.

FIG. 13 shows the composite laminate 6 of FIG. 1 with the prefailure indication element 7 having the prefailure indication projection 7a that is provided in the opening 6a and now embodied according to a seventh embodiment. In this seventh embodiment, the prefailure indication projection 7a is again annular and, thus, particularly suitable for applications with more than one main load direction.

However, in contrast to the sixth embodiment, multiple prefailure indication projections 7a are now arranged between multiple tangential recesses 18 that are preferably arranged equidistantly around the opening 6a. The number of tangential recesses 18 and corresponding prefailure indication projections 7a is application-specific and amongst others dependent on an underlying number of possible load directions.

Figure 14:
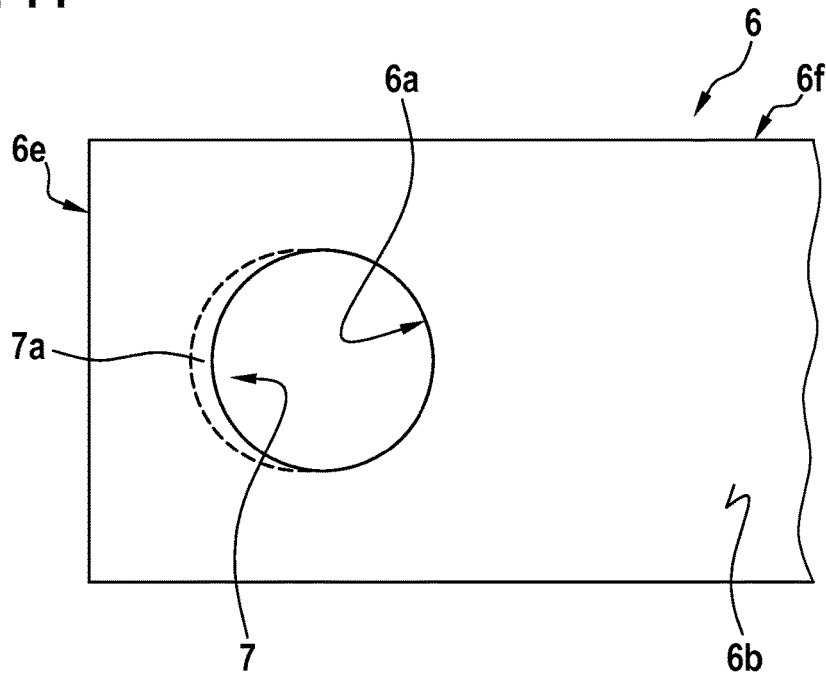
FIG. 14 shows a sectional view of the composite laminate of FIG. 1 and FIG. 2, seen in direction of arrows III-III of FIG. 2, according to an eighth embodiment.

FIG. 14 shows the composite laminate 6 of FIG. 1 with the prefailure indication element 7 having the prefailure indication projection 7a that is provided in the opening 6a and now embodied according to an eighth embodiment. In this eighth embodiment, the prefailure indication projection 7a is illustratively arc-shaped like in the first embodiment. However, in contrast to the first embodiment, the prefailure indication projection 7a now comprises a constituting material that is weaker than a constituting material of the composite laminate 6.

It should be noted that the prefailure indication element 7 is always described above with reference to FIGS. 1 to 14 as being realized by the composite laminate 6. However, other realizations are also possible and likewise contemplated, as described hereinafter with reference to FIGS. 15 to 20.

Figure 15:
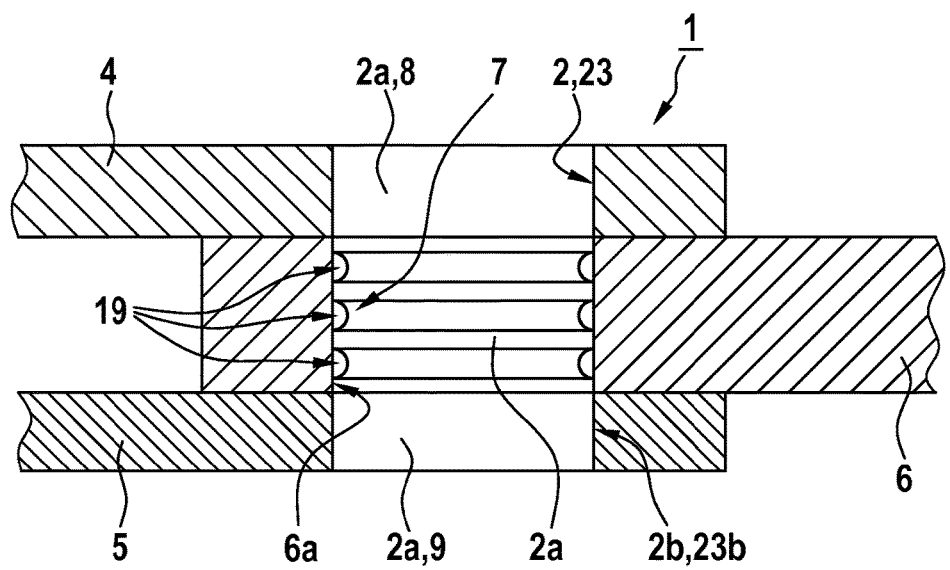
FIG. 15 shows a simplified sectional view of the load-introduction joint of FIG. 1, with a load-introduction component according to a second embodiment.

FIG. 15 shows the load-introduction joint 1 of FIG. 1 with the upper and lower components 4, 5, the composite laminate 6, the associated load-introduction component and the prefailure indication element 7. As described above, the load-introduction component is either embodied by the bolt 2 with the bolt shaft 2a, or by the bushing 23, which are here exemplarily illustrated as a single component, for simplicity and clarity of the drawings.

According to one aspect of the present invention, the prefailure indication element 7 is provided on a cylindrical section of the load-introduction component, i.e. on an outer circumference 2b of the bolt shaft 2a of the bolt 2 or on an outer circumference 23b of the bushing 23. Preferably, the prefailure indication element 7 comprises at least one and, preferentially, multiple annular recesses 19 provided on said cylindrical section. Thus, a contact surface between the bolt 2, or the bushing 23, and the composite laminate 6 in the opening 6a can be reduced in analogy to what is said above.

It should be noted that such a reduction of the contact surface can be achieved by performing multiple different modifications to the bolt 2 or the bushing 23. Therefore, various modified bolts 2 and bushings 23 are shown in FIGS. 16 to 20 and described below, by way of example. However, it should be noted that corresponding modifications can likewise be applied to either one of the bolt 2 or the bushing 23, so that in each one of FIGS. 16 to 20 respectively only a single component is shown that simultaneously and schematically represents the bolt 2 and the bushing 23.

Figure 16:
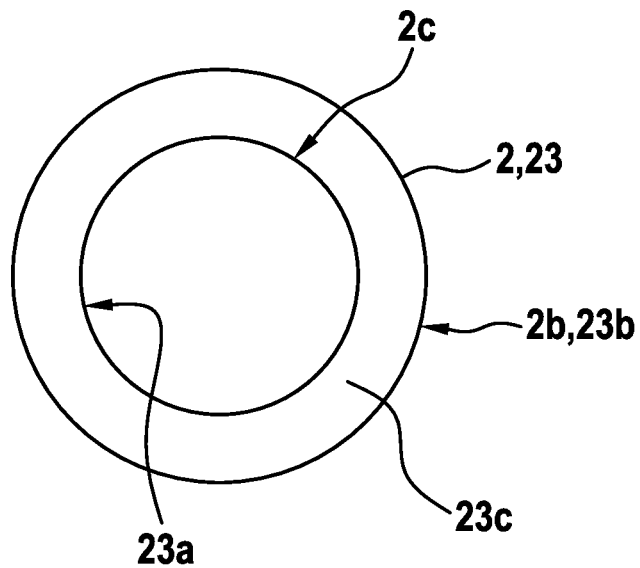
FIG. 16 shows a sectional view of the load-introduction component of FIG. 1 according to a third embodiment.

FIG. 16 represents on the one hand the bolt 2 of FIG. 15 with the bolt shaft 2a, which is at least partly embodied with a varying or reduced outer circumference 2c, e.g. by means of an annular recess. The reduced outer circumference 2c and the normal outer circumference 2b of the bolt shaft 2a as such are preferably arranged concentrically.

On the other hand, FIG. 16 represents the bushing 23 of FIG. 15, which comprises the opening 23a. The latter and the sleeve-like area 23c of the bushing 23 are preferably arranged concentrically.

Figure 17:
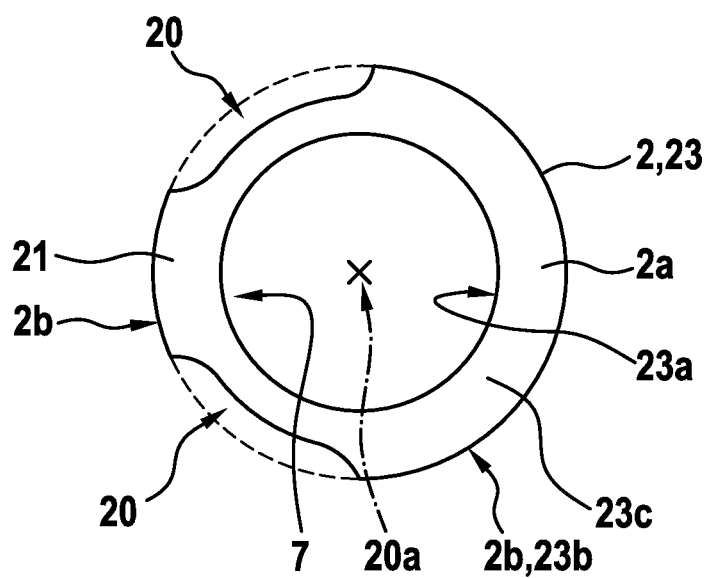
FIG. 17 shows a sectional view of the load-introduction component of FIG. 1 according to a fourth embodiment.

FIG. 17 represents on the one hand the bolt 2 of FIG. 15 with the bolt shaft 2a, which is at least partly embodied with at least one peripheral cut-out 20 provided on its cylindrical section, i.e. on the outer circumference 2b of the bolt shaft 2a. On the other hand, FIG. 17 represents the bushing 23 of FIG. 15, which comprises said at least one peripheral cut-out 20 in its sleeve-like area 23c.

In both cases, the at least one peripheral cut-out 20 is arranged in parallel to a middle axis 20a of the bolt 2 or the bushing 23. Furthermore, by way of example two peripheral cut-outs 20 are provided and arranged in mirror-symmetry relative to each other.

Figure 18:
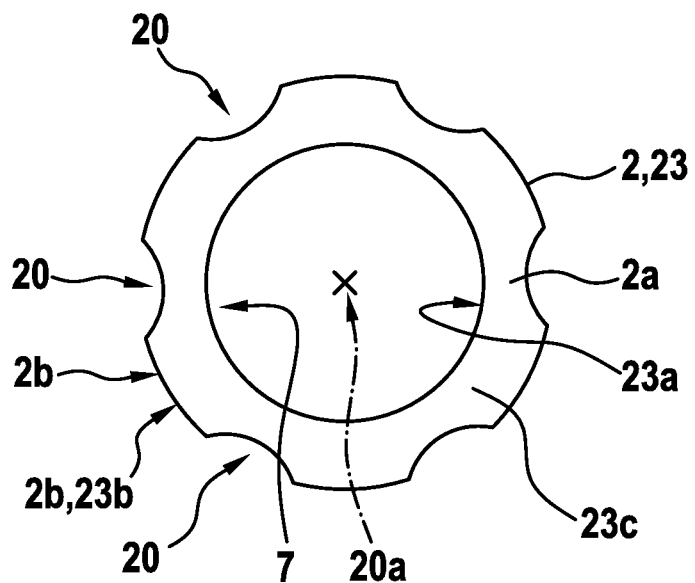
FIG. 18 shows a sectional view of the load-introduction component of FIG. 1 according to a fifth embodiment.

FIG. 18 represents on the one hand the bolt 2 of FIG. 17 with the bolt shaft 2a, which is at least partly embodied with multiple peripheral cut-outs 20 provided on its cylindrical section, i.e. on the outer circumference 2b of the bolt shaft 2a. On the other hand, FIG. 18 represents the bushing 23 of FIG. 17, which comprises said multiple peripheral cut-outs 20 in its sleeve-like area 23c.

In both cases, the multiple peripheral cut-outs 20 are preferably arranged equidistantly around the middle axis 20a of the bolt 2 or the bushing 23. The bolt 2 or bushing 23 according to FIG. 18 is particularly suitable for applications with more than one main load direction.

Figure 19:
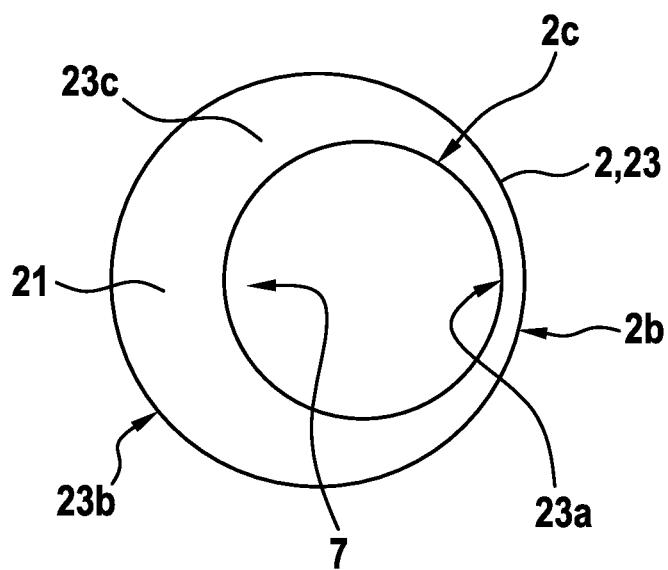
FIG. 19 shows a sectional view of the load-introduction component of FIG. 1 according to a sixth embodiment.

FIG. 19 represents on the one hand the bolt 2 of FIG. 15 with the bolt shaft 2a, which is at least partly embodied with a varying or reduced outer circumference 2c, e.g. by means of an annular recess. The reduced outer circumference 2c and the normal outer circumference 2b of the bolt shaft 2a as such are preferably arranged eccentrically.

On the other hand, FIG. 19 represents the bushing 23 of FIG. 15, which comprises the opening 23a. The latter and the sleeve-like area 23c of the bushing 23 are preferably arranged eccentrically. Accordingly, the sleeve-like area 23c comprises a thicker side that defines an indication projection 21.

Figure 20:
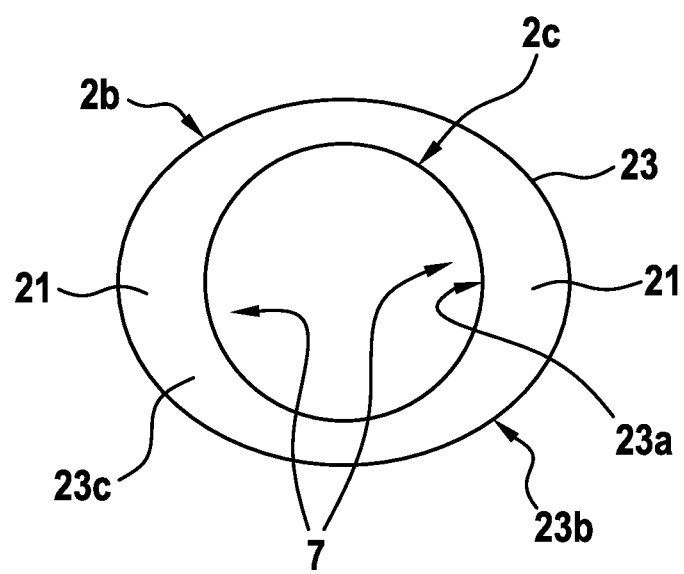
FIG. 20 shows a sectional view of the load-introduction component of FIG. 1 according to a seventh embodiment.

FIG. 20 represents on the one hand the bolt 2 of FIG. 15 with the bolt shaft 2a, which is at least partly embodied with a varying or reduced outer circumference 2c, e.g. by means of an annular recess. The reduced outer circumference 2c and the normal outer circumference 2b of the bolt shaft 2a as such are preferably arranged concentrically with the normal outer circumference 2b being elliptical.

On the other hand, FIG. 20 represents the bushing 23 of FIG. 15, which comprises the opening 23a. The latter is annular and arranged concentrically to the sleeve-like area 23c of the bushing 23, which is preferably elliptical.

It should be noted that the above described, preferred embodiments are merely described to illustrate possible embodiments of the present invention, but not in order to restrict the present invention thereto. Instead, multiple modifications and variations of the invention are possible and should, therefore, also be considered as being part of the invention. In particular, combinations of the above described variations are possible and should, thus, be considered as being covered by the present invention. In particular, such variations and modifications are readily available to the person skilled in the art and may become necessary dependent e.g. on an underlying number of load directions and other application-specific parameters, such as a predetermined edge distance, number of bolts and/or bushings to be used, and so on.

REFERENCE LIST 1 load-introduction joint
2 bolt
2a bolt shaft
2b bolt shaft outer circumference
2c reduced bolt shaft outer circumference
3 nut
4 first attachment component
4a first attachment component opening
5 second attachment component
5a second attachment component opening
6 composite laminate
6a composite laminate opening
6b composite laminate upper side
6c composite laminate lower side
6d composite laminate opening center
6e composite laminate end edge
6f composite laminate longitudinal edge
6g peripheral opening side
7 composite laminate prefailure indication element
7a prefailure indication projection
7b upper axial recess
7c lower axial recess
7d prefailure indication projection thickness
8 first bushing
8a first bushing opening
8b first bushing outer circumference
8c first bushing sleeve-like area
9 second bushing
9a second bushing opening
9b second bushing outer circumference
9c second bushing sleeve-like area
10 main load direction
11a end edge distance
11b longitudinal edge distance
11c composite laminate opening diameter
11d composite laminate thickness
11e prefailure indication projection length
12a initial bolt/bushing position
12b prefailure indication bolt/bushing position
13 prefailure gap
14a transversal composite laminate rupture
14b longitudinal composite laminate rupture
15a upper axial chamfer
15b lower axial chamfer
16 undercut
17 prefailure layer
18 tangential recesses
19 peripheral recesses
20 peripheral cut-outs
20a middle axis
21 bushing indication projection 23 third bushing
23a third bushing opening
23b third bushing outer circumference
23c third bushing sleeve-like area
F main load

What is claimed is:

1. A composite laminate for connection to at least one attachment component in a load-introduction joint, the composite laminate comprising:
   an opening extending between opposing sides of the composite laminate and defining a central axis, the opening being adapted to receive a load-introduction component of the load-introduction joint therethrough; and
   a prefailure indication projection defined in and circumferentially extending along a portion of a peripheral sidewall of the opening, the prefailure indication projection having a first position and a second position, the projection being compressed or partially destructed from the first position to the second position by the load-introduction component in a prefailure mode of the load-introduction joint for indication of an impending function-affecting failure of the composite laminate,
   wherein the prefailure indication projection comprises an arc-shaped projection defined between axially opposing circumferentially-extending first and second arc-shaped axial recesses that extend radially away from the central axis into the peripheral sidewall of the opening, and
   wherein the prefailure indication projection extends radially toward the central axis between the first and second arc-shaped axial recesses.

2. The composite laminate according to claim 1, wherein the prefailure indication projection is arranged diametrically opposed to a main load direction of a main load that is applicable to the composite laminate in operation.

3. The composite laminate according to claim 1, wherein the prefailure indication projection is formed to reduce a given contact surface between the load-introduction component and the composite laminate when the prefailure indication projection is in the first position.

4. The composite laminate according to claim 1, wherein the prefailure indication projection comprises a projection thickness that amounts to at least 50% and at most 90% of a thickness of the composite laminate adjacent to the load-introduction component when the prefailure indication projection is in the first position.

5. A composite laminate for connection to an attachment component in a load-introduction joint, the composite laminate comprising:
   a through-hole opening extending between opposing sides of the composite laminate and defining a central axis, the opening being adapted to receive a load-introduction component of the load-introduction joint therethrough; and
   a prefailure indication projection defined in and circumferentially extending along a portion of a peripheral sidewall of the through-hole opening, the prefailure indication projection being compressed or partially destructed from a first condition to a second condition by the load-introduction component in a prefailure mode of the load-introduction joint, providing an indication of an impending function-affecting failure of the composite laminate,
   wherein the prefailure indication projection comprises an arc-shaped projection defined between axially opposing circumferentially-extending first and second arc-shaped axial recesses that extend radially away from the central axis into the peripheral sidewall of the through-hole opening, and
   wherein the prefailure indication projection extends radially toward the central axis between the first and second arc-shaped axial recesses.

6. The composite laminate according to claim 5, wherein the prefailure indication projection is arranged diametrically opposed to a main load direction of a main load that is applicable to the composite laminate in operation.

7. A composite laminate for connection to an attachment component in a load-introduction joint, the composite laminate comprising:
   a through-hole opening extending between opposing sides of the composite laminate and defining a central axis, the opening being adapted to receive a load-introduction component of the load-introduction joint therethrough, the through-hole opening having a diameter; and
   a prefailure indication projection defined in and circumferentially extending along a portion of a peripheral sidewall of the through-hole opening, the prefailure indication projection being compressed or partially destructed from a first condition to a second condition by the load-introduction component in a prefailure mode of the load-introduction joint, providing an indication of an impending function-affecting failure of the composite laminate,
   wherein the prefailure indication projection comprises an arc-shaped projection defined between axially opposing circumferentially-extending first and second arc-shaped axial recesses that extend radially away from the central axis into the peripheral sidewall of the through-hole opening,
   wherein the prefailure indication projection extends radially toward the central axis between the first and second arc-shaped axial recesses, and
   wherein the prefailure indication projection defines a length extending radially into the through-hole opening in a direction substantially orthogonal to a central axis of the through-hole opening, and wherein the length is no more than 50% of the diameter of the through-hole opening.

* * * * *